INVENTOR
ROBERT K. NORTON
BY Yount and Tarolli
ATTORNEYS

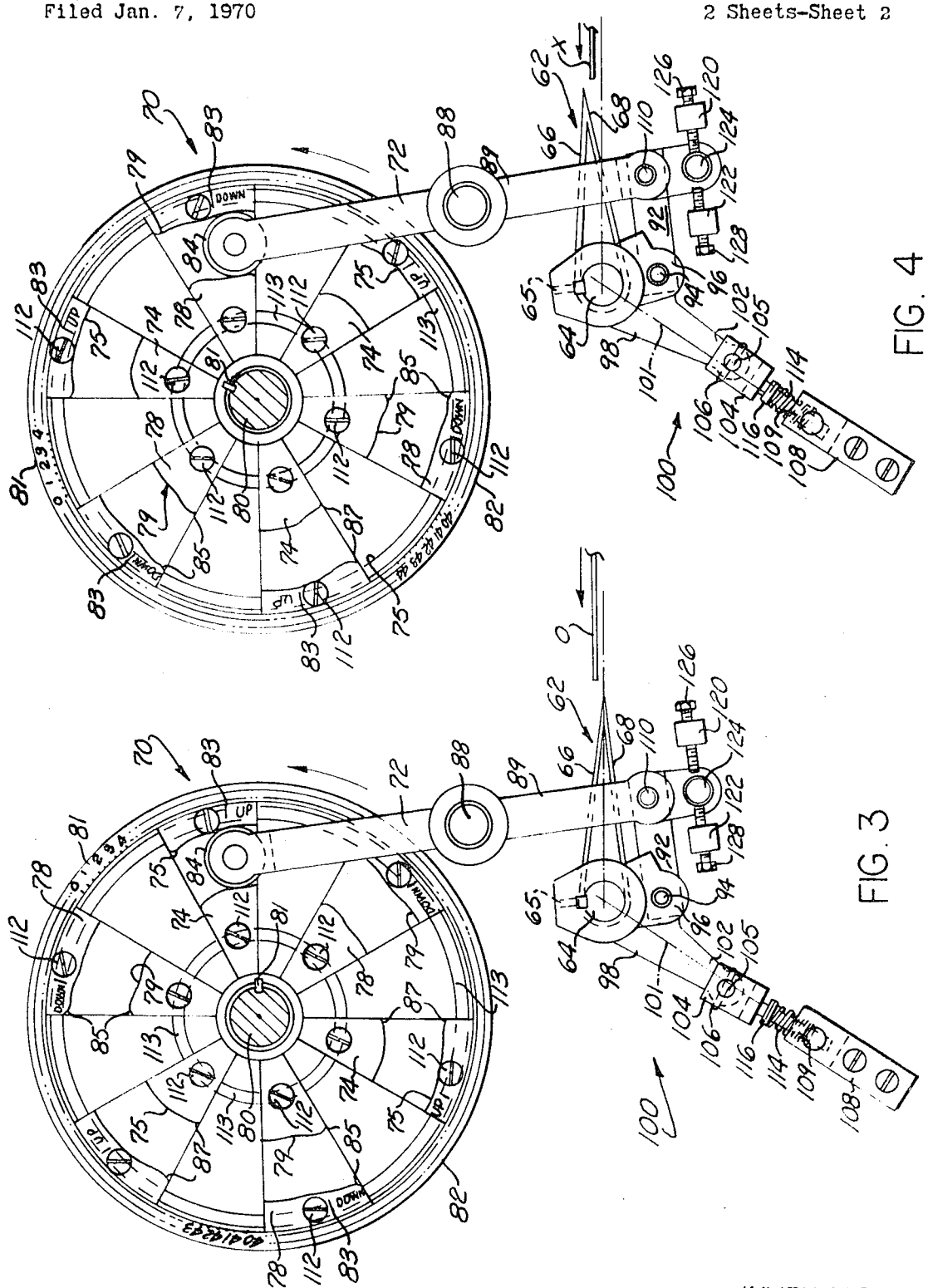

United States Patent Office 3,667,753
Patented June 6, 1972

3,667,753
GATE MECHANISM FOR PROCESSING A STREAM OF ARTICLES
Robert K. Norton, Twinsburg, Ohio, assignor to Harris-Intertype Corporation, Cleveland, Ohio
Filed Jan. 7, 1970, Ser. No. 1,257
Int. Cl. B65h 29/60
U.S. Cl. 271—64
10 Claims

ABSTRACT OF THE DISCLOSURE

An improved apparatus for processing a stream of articles made of sheet material includes an article classifying gate which has a first position in which it directs a flow of articles of one class to a first means for receiving the articles and a second position in which it directs the flow of the articles of another class to a second means for receiving the articles. The gate has a link associated therewith which is movable by a plurality of spaced apart cam members which move the gate between its first and second positions in a timed relationship with the flow of articles past the gate. The link is operable to move the gate when a cam follower mounted thereon engages with one of the cam members and is ineffective to control the position of the gate when the cam follower is not engaged with one of the cam members. A spring loaded toggle linkage is provided for maintaining the gate in a selected position to which it has been moved by the cam members during the portion of the operation of the apparatus in which the cam members are not engaged with the cam follower. This construction allows the spaced apart cam members to be moved relative to each other so as to enable the apparatus to classify many different types and sizes of articles without the necessity of long time delays and costly change-over procedures every time it is desired to classify a new set of articles which are different from the preceding set of articles which have been classified by the apparatus.

---

The present invention relates to apparatus for processing a stream of articles and more specifically to an article classifying gate and means associated therewith for positioning the gate so as to enable the gate to provide for the flow of articles of different classes to different locations.

Apparatus for processing a stream of articles are well known in the art. Some of the known apparatus utilize solid continuous cams for classifying articles of different types into their respective classes. These solid cams are costly and must be replaced every time the apparatus processes articles which are of a different size than the previous articles processed.

It is desirable that any type of classification means be easily adjustable so as to enable the apparatus to classify articles of different types and sizes. The apparatus should be able to classify one group of articles into classes and then be readily adjusted so as to be able to work on another new set of articles of a different type and size and classify them into classes. The known apparatus suffers from the disadvantage that a substantial period of time and a high degree of skill is required to reset the apparatus to work on another set of articles which is different from the preceding set of articles which the apparatus classified. This results in long and costly delays when resetting the apparatus to work on different sets of articles.

Accordingly, an object of the present invention is to provide a new and improved apparatus for processing a stream of articles made of sheet material wherein the hereinabove discussed disadvantages are overcome and means are provided for classifying articles so that articles of one class are delivered to one location and articles of another class are delivered to another location and wherein the means is easily and quickly adjustable so as to enable the apparatus to provide for the classification of many different types of articles.

The preceding object of the present invention is achieved by providing a unique apparatus for processing articles made of sheet material comprising an article classifying gate having a first position which directs the articles of one class to one location and a second position which directs the articles of another class to another location, a control means for controlling the position of the gate and which is ineffective to control the position of the gate during at least a portion of the operation of the apparatus and means for maintaining the gate in a selected position during the portion of the operation of the apparatus in which the control means is ineffective to control the position of the gate. The selected position in which the gate is maintained is the position which was selected by the control means when the control means was last effective to control the position of the gate. The construction of the control means so that it is effective to control the position of the gate during certain portions of the operation of the apparatus and ineffective to control the position of the gate during other portions of the operation of the apparatus enables the control means to be easily and quickly reset to accommodate articles of different types and sizes during different operational periods of the machine.

Another object of the present invention is to provide a new and improved apparatus for processing a stream of articles including first and second means for receiving the articles, an article classifying means which has a first position which provides for the flow of the articles to the first means for receiving the articles and a second position which provides for the flow of the articles to the second means for receiving the articles, control means for controlling the position of the article classifying means and which is ineffective to control the position of the article classfying means during at least a portion of the operation of the apparatus and means for maintaining the article classifying means in a selected position during the portion of the operation of the apparatus in which the control means is ineffective to control the position of the article classifying means.

A further object of the present invention is to provide a new and improved apparatus for processing a stream of articles as noted in the next preceding object wherein the article classifying means comprises a gate which is movable between first and second positions to thereby provide for the flow of articles to the first and second means for receiving the articles respectively.

A still further object of the present invention is to provide a new and improved apparatus for processing a stream of articles including first and second means for receiving the articles, an article classifying means which has a first position which provides for the flow of the articles to the first means for receiving the articles and a second position which provides for the flow of the articles to the second means for receiving the articles, control means for controlling the position of the article classifying means and which is ineffective to control the position of the article classifying means during at least a portion of the operation of the apparatus, means for maintaining the article classifying means in a selected position during the portion of the operation of the apparatus in which the control means is ineffective to control the position of the article classifying means, and wherein the control means include a link member operatively associated with the article classifying means for effecting movement of the article classifying means between its first and second position, and means for effecting movement of the link to thereby effect movement of the article classifying means.

Still another object of the present invention is to provide a new and improved apparatus for processing a stream of articles as noted in the next preceding object wherein the link includes a cam follower supported thereon and the means for effecting movement of the link comprises an interrupted cam means which has cam portions thereon for engaging with the cam follower and effecting movement of the link to thereby move and control the position of the article classifying means and an interrupted portion thereon which is incapable of controlling the position of the link and the article classifying means.

A further object of the present invention is to provide a new and improved apparatus for processing a stream of articles as noted in the next preceding object wherein the means for maintaining the article classifying means in a selected position comprises a spring loaded toggle linkage which is operable to hold the article classifying means in the selected position during the portion of the operation of the apparatus in which the control means is incapable of controlling the position of the article classifying means and wherein the selected position is the position to which the article classifying means has last been moved by the control means when the control means was last effective to control the position of the article classifying means.

Another object of the present invention is to provide a new and improved apparatus for processing a stream of articles as noted in the next preceding object wherein the article classifying means comprises a gate which is movable between a first position in which it provides for the flow of articles of one class to the first means for receiving articles and a second position in which it provides for the flow of articles of another class to the second means for receiving the articles.

Further objects and advantages of the present invention should become apparent from the following detailed description of the preferred embodiment of the present invention made with reference to the accompanying drawings forming a part of the specification and wherein.

FIG. 3 is a schematic side view of the article classifying gate and the means for effecting movement of the gate and maintaining the gate in a selected position and showing the gate in a position in which it directs the articles to the first article receiving means; and FIG. 4 is a schematic side view of the portion of the apparatus illustrated in FIG. 3 and illustrating the article classifying gate in a position in which it provides for the flow of articles to the second means for receiving the articles.

The present invention provides an improved apparatus for processing a stream of articles which have been cut from sheet material. In general, the apparatus is operable to separate a plurality of articles into different classes so that the articles of one class are delivered to a location where they may be stacked and the articles of another class are delivered to a different location where they may be stacked. The preferred embodiment of the present invention to be described hereinbelow is especially adapted for use in the formation of carton or box blanks from sheet material and is of a construction which provides for extremely high speed and reliable operation and is easily adjustable so that the mechanism may handle many different types of carton or box blanks.

The words "classify" and "classifying" and words of similar import are used throughout this specification. These words mean the same as "divert," "distribute," "direct," etc., and these latter words can be substituted for the former in each case.

Figure 1:
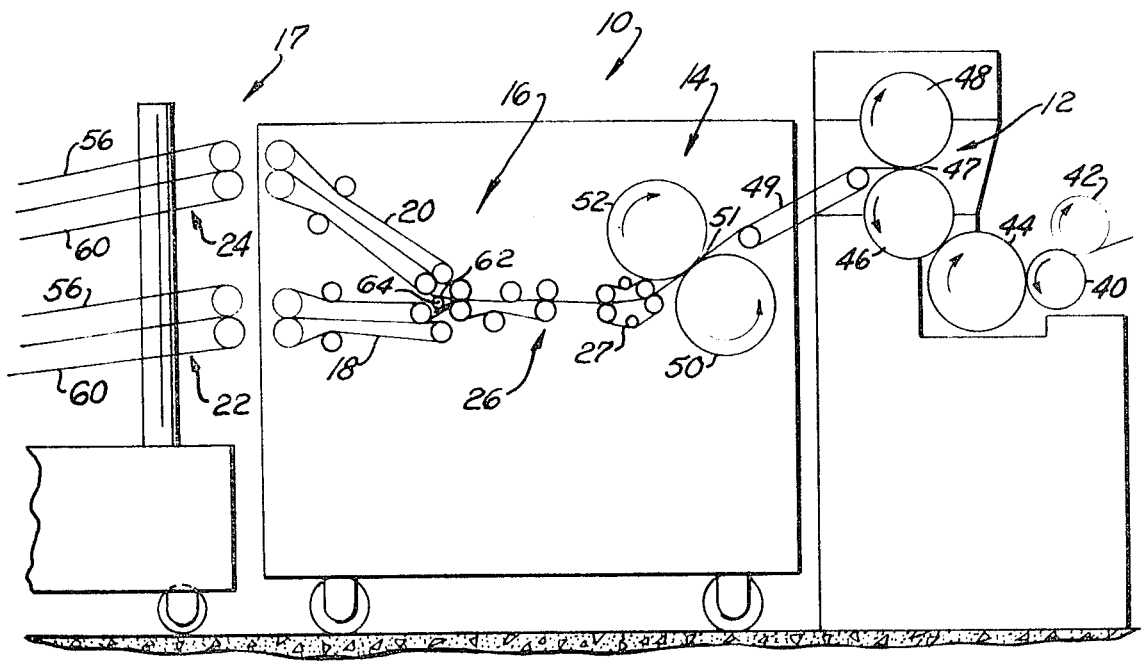
FIG. 1 is a schematic side elevational view of apparatus for processing a stream of articles embodying the present invention.

As representing a preferred embodiment of the present invention, FIG. 1 illustrates an improved apparatus 10 for processing a stream of articles made of sheet material. The apparatus 10 includes, in general, a cutting and creasing unit 12 in which sheet material is cut and creased into carton blanks and waste material. The material cut into carton blanks and waste is delivered from the cutting and creasing unit 12 into a separator unit 14. The separator unit 14 is operable to separate the carton blanks and the wastes and deliver the carton blanks to a transfer conveyor 26. The transfer conveyor 26 delivers the carton blanks to an article classifying means 16 which classifies the articles and directs the articles of one class to the first means for receiving the articles 20 or the second means for receiving the articles 18. The articles, after they are classified by the article classifying means 16, are directed to the skewing conveyor unit 17 which laterally separates carton blanks which are cut from the material and delivers the carton blanks to a shingling and stacking unit which is not illustrated. The shingling and stacking unit is operable to shingle the carton blanks and stack the carton blanks for removal from the apparatus in a well-known manner.

Preferably, the sheet material which is processed by the apparatus 10 is cardboard sheet material having an outline of a plurality of carton blanks printed thereon in closely spaced relationship and lying in rows on the material with each row extending transverse to the feed of the material. The sheet material is thus cut providing a plurality of carton blanks spaced immediately adjacent to each other in a row and the sheets are fed through the apparatus in this manner. The sheet material is so dimensioned that a plurality of rows of carton blanks are cut from each sheet.

Figure 2:
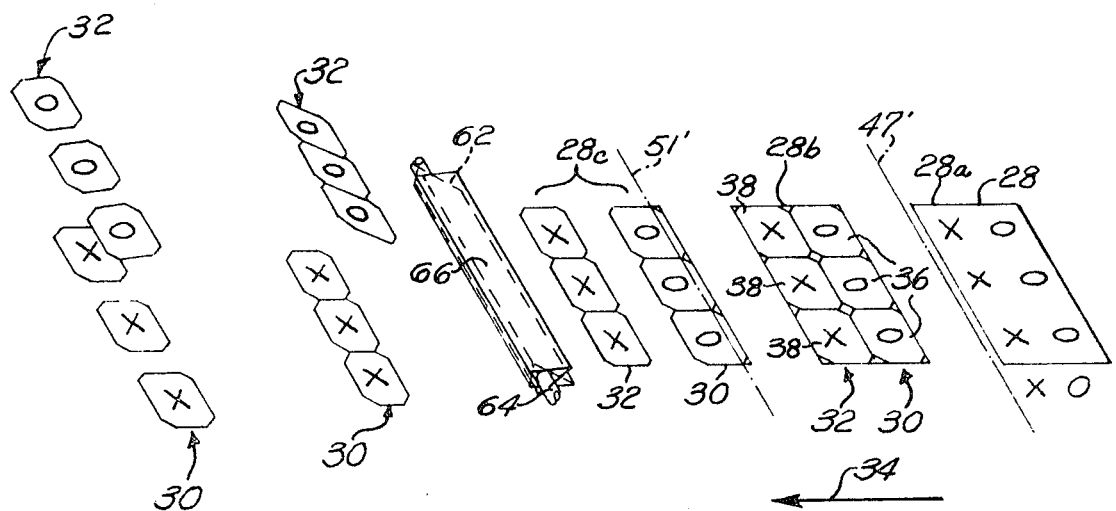
FIG. 2 is a schematic view of a sheet and the articles formed thereon as the sheet progresses through the apparatus of FIG. 1.

A portion of the sheet which is to be processed by the apparatus 10 is shown in FIG. 2. The arrow 34 indicates the direction of feed of the material. When a sheet 28 is fed into the cutting unit 12, it has a plurality of images printed thereon such as the X and O images illustrated on sheet 28a. The printed sheet is fed between a pair of rollers 40 and 42 which cooperate to direct the sheet to a transfer roll 44. The transfer roll 44 includes suitable gripper means thereon which engage with the sheet and direct the sheet from the rolls 40 and 42 to the cutting and creasing unit 12.

The cutting and creasing unit 12 comprises a pair of cutting and creasing rolls 46 and 48 which rotate adjacent each other at substantially the same surface speed. The cutting roll 46 includes suitable grippers thereon which engage with the sheet as it passes from the transfer roll 44 to thereby direct the sheet through a cutting nip 47 which is located between the pair of cutting and creasing rolls 46 and 48. As the sheet passes through the cutting nip 47, the cutting and creasing rolls 46 and 48 cooperate to cut and crease the sheets 28 as they pass therebetween in a well-known manner.

A sheet 28b which has been cut and creased by the cutting and creasing unit 12 as it passes through the cutting and creasing nip 47, whose position is illustrated schematically by the phantom line 47' in FIG. 2, comprises two rows 30 and 32. The rows 30 and 32 each contain a desired number of carton blanks such as the blanks 36 having O printed thereon and the blanks 38 having X printed thereon. The blanks 36 which are disposed in the row 30 of the sheet 28 are all blanks of the same type and the blanks 38 which are disposed in the row 32 of the sheet 28 are all blanks of the same type. The blanks 36 and 38 may preferably be different types of cartons or have different images printed thereon such as the X and O images illustrated in FIG. 2.

After the sheets are cut and creased by the cutting and creasing unit 12, the sheets are then transferred by a conveyor 49 to a stripper unit 14 which is operable to separate the waste material from the articles. The stripper unit 14 includes a pair of rotary cylinders 50 and 52 which cooperate to effect a separation of the carton blanks and waste delivered thereto. The cylinders 50 and 52 rotate adjacent each other and define a stripping nip 51 therebetween. The position of the stripping nip 51 is schematically illustrated by the phantom line 51' in FIG. 2. The rotary cylinders 50 and 52 which cooperate to separate the articles and the waste material are the same size as the cutting and creasing cylinders 46 and 48 and are driven at substantially the same surface speed. The cylinders 50 and 52 operate to separate the waste material from the carton blanks in a well-known manner and are more fully described in the Sarka Pat. 3,410,183, issued Nov. 12, 1968 and assigned to the same assignee as the present invention. As the articles pass from the stripper unit 14, the rows of articles are held together by tabs which are easily broken to separate the articles.

A transfer conveyor unit 26 is operable to transfer the sheets 28 from the stripper unit 14 to the article classifying means 16. The conveyor unit 26 is driven at a speed which is substantially greater than the speed at which the stripping unit 14 is driven. Running at the surface speed of cylinders 50 and 52 is a conveyor means 27 which engages with the top and bottom portion of a sheet while another portion of the sheet is still in the stripping nip 51. The conveyor unit 26 is driven at a substantially greater speed than the stripping unit 14 so that the conveyor 26 engages with and speeds up one portion of a sheet relative to the portion of the sheet which is in the conveyor means 27. This causes the tabs between the rows 30 and 32 of articles to be broken and the rows of articles are separated from each other as shown in FIG. 2 at 28c. The rows of articles 30 and 32 then travel along the conveyor unit 26 to the article classifying means 16.

The article classifying means 16 is operable to direct the rows 30 and 32 of articles 36 and 38, respectively, to the first means for receiving the articles which comprises the transfer conveyor unit 20 and the second means for receiving the articles which comprise the transfer conveyor 18. It should be apparent from FIG. 2 that the article classifying means 16 directs only the rows 32 of articles 38 to the transfer conveyor unit 20 and only the rows 30 of the articles 36 to the transfer conveyor unit 18. In this manner the articles are classified into their respective classes. The conveyor units 18 and 20 operate at the same speed as the transfer conveyor unit 26.

As noted hereinabove, the carton blanks which are cut from the sheet material are located immediately adjacent to each other in a side-by-side relation. As shown in FIG. 2, the rows 30 and 32 are arranged so that there is no lateral separation of the carton blanks due to the operation of the stripper unit 14 and the means 27 of the conveyor unit 26 and, therefore, the carton blanks are received by the skewing conveyor 17 in a close, laterally spaced relation. The skewing conveyor 17 includes a lower skewing unit 22 and an upper skewing unit 24 each of which is operable to separate the carton blanks laterally so that the carton blanks may be readily and easily shingled and stacked without interference between adjacent carton blanks.

The skewing conveyor unit 17 includes an upper tier of skewing conveyors 24 for receiving carton blanks from the upper conveyor unit 20 and a lower tier of skewing conveyors 22 for receiving carton blanks from the conveyor unit 18. The upper and lower tiers of conveyors 22 and 24 each include a plurality of upper tape conveyors 56 and a plurality of lower tape conveyors 60. The upper side of the carton blanks are engaged by the plurality of upper tape conveyors 56 and the lower side of the carton blanks are engaged by the plurality of lower tape conveyors 60. The tape conveyors 56 and 60 have a fan-like configuration which is not illustrated but which is well-known in the art so that as the articles pass therealong, the articles are engaged with the tapes which cooperate to break the tabs which hold the articles in their respective rows. As the tabs are broken, the articles are laterally separated as is illustrated in FIG. 2. This lateral separation of the articles and the construction of the skewing conveyor 17 is more fully described in the Sarka Pat. No. 3,410,183.

Preferably, a shingling and stacking unit such as the shingling and stacking unit disclosed in the Sarka Pat. No. 3,410,183 is operable to receive the carton blanks from the skewing conveyor unit 17. The shingling and stacking unit shingles the carton blanks and stacks the carton blanks for removal from the apparatus. The operation of the shingling and stacking unit is well-known in the art and, therefore, has not been illustrated.

The article classifying means 16 includes an article classifying gate 62 which is located between the transfer conveyor 26 and the means for receiving the articles 18 and 20. The article classifying gate 62 is rigidly supported on a shaft 64 so that rotation of the shaft will effect movement of the gate 62. The gate 62 has a substantially triangular configuration and includes an upper side portion 66 and a lower side portion 68. The gate 62 has a first position illustrated in FIG. 3 in which the articles traveling along the conveyor means 26 move upwardly along the upper portion 66 of the gate 62 to the first means 20 for receiving the articles. When the shaft 64 is rotated in a counterclockwise direction from its position illustrated in FIG. 3, the gate 62 will be moved to its second position as illustrated in FIG. 4. When the gate 62 is in its second position, the articles flowing along the conveyor means 26 will engage with the lower portion 68 of the gate 62 which will direct the flow of articles to the second means 18 for receiving the articles. Thus, rotation of the shaft 64 can control the position of the gate 62 so that the articles in the rows 30 and 32 can be classified to the first and second means for receiving the articles.

The control means for controlling the position of the gate 62 includes interrupted cam means 70. The cam means 70 include a plurality of cam members 74 and 78 which are disposed in an annular cam holder 82. The cam holder 82 is suitably affixed to the shaft 80 by the key 81 so that rotation of the shaft 80 effects rotation of the cam holder 82. The shaft 80, the cam holder 82, and the cam member located therein are rotated in a time relationship with the apparatus 10 so that the cam members 74 and 78 will assume a position at all times which is responsive to location of the articles as they flow through the article processing apparatus. Preferably the cam holder 82 rotates at the same surface speed as the stripping cylinders 50 and 52.

A link member 72 is associated with the article processing means and includes a cam follower 84 located on one end thereof. The cam follower 84 is operable to engage with the cam members 74 and 78 as the cam members rotate with the cam holder 82. The link member 72 is supported for rotation about a shaft 88 upon engagement of the cam follower 84 with the cam members 74 and 78. The opposite end 89 of the link member 72 is connected by a pivot pin 110 with a link member 92 so that rotation of the link 72 about the shaft 88 effects movement of the link member 92.

The link member 92 is connected at one end thereof to an arm 96 of a bracket 98 by a pin member 94. The bracket member 98 is received on the shaft 64 and is rigidly affixed thereto by a set screw and key assembly 65 so that rotation of the bracket 98 effects rotation of the shaft 64 upon which the gate 62 is rigidly supported. Thus it should be apparent that when the link member 72 is rotated about the shaft 88 the rotational movement of the link member will be transferred through the link 92 to the bracket 98 to effect rotation of the shaft 64 and the gate 62 which is rigidly supported thereon.

The cam members 74 and 78 are disposed in a spaced apart relationship on the annular cam holder 82 by a plurality of fasteners such as the bolts 112. The bolts 112 extend through the cam members 74 and 78 and are received in suitable grooves 113 so that the cam members may be rigidly affixed to the cam holder 82. The grooves 113 preferably have a T shaped configuration and the bolts 112 are preferably cooperable with suitable nuts, not illustrated, which are located in the grooves and which cooperate with the bolts to fix the cam members relative to the cam holder 82. The cam members 74 and 78 are operable to effect rotation of the link member 72 about the shaft 88 in a clockwise or a counterclockwise direction. It should be apparent that rotation of the link 72 in a clockwise direction effects rotation of the bracket 98 and rotation of the gate 62 in a clockwise direction with the shaft 64 to locate the gate in its first position as illustrated in FIG. 3 in which the articles are directed to the first means 20 for receiving the articles. Accordingly, rotation of the link 72 in a counterclockwise direction about shaft 88 effects rotation of the gate 62 in a counterclockwise direction to its second position as illustrated in FIG. 4 in which the gate directs the articles to a second means 18 for receiving the articles.

The cam members 74 include cam tracks 75 which are operable to receive the cam follower 84 therein upon rotation of the cam holder 82. The cam holder 82 normally rotates in a counterclockwise direction and it should be apparent from the configuration of the cam tracks 75 that when the cam follower 84 engages therein a clockwise rotation of the link 72 will be effected to thereby locate the gate member 62 in its first position. The cam members 78 include cam tracks 79 therein which are operable to receive the cam follower 84 therein upon rotation of the cam holder 82. When the cam track 79 engages with the cam follower 84, the cam track 79 will move the cam follower 84 to the left to its position illustrated in FIG. 3 which will rotate the link 72 in a counterclockwise direction about the shaft 88 to thereby effect a counterclockwise movement of the gate 62 and about the shaft 64. The gate 62 will then assume its second position as illustrated in FIG. 4 in which it directs the articles to the second means 18 for receiving the articles. Thus, it should be apparent that the cam members 74 and 78 will control the position of the gate 62 when the cam follower 84 is received therein to thereby direct the flow of articles to either the first or second means for receiving the articles.

The cam members 74 and 78 are preferably located in the cam holder 82 in a spaced apart relationship so that the cam tracks 75 and 79 engage with the cam follower 84 only when it is desired to effect movement of the gate 62. The cam members 74 and 78 are located about the cam holder 82 in such a manner that the gate 62 will be moved between its first and second position when different rows 30 and 32 of the different classes of articles pass thereby. This will enable the article classifying gate 62 to direct the individual rows of articles to the different means for receiving the articles so that the articles of one class will flow to one means for receiving the articles and the articles of another class will flow to the other means for receiving the articles. Once the gate is moved to one of its positions by either the cam 74 or the cam 78, the gate will remain in that selected position until the cam follower 84 engages with another cam member. It should be apparent that while a sheet having two transverse rows of carton blanks is illustrated in FIG. 2 the set up of the cams 74 and 78 is illustrated in FIGS. 3 and 4, provide for the classification of a sheet having six rows of articles.

The location of the cam members in the cam holder 82 is dependent upon the size and the type of articles to be classified. The larger the articles to be classified the larger the space between the cam members 74 and 78 and, conversely, the smaller the articles to be classified the smaller the space between the cam members 74 and 78. The classification of articles is facilitated by the fact that the cam members are located only at the points in the cam holder 82 at which it is desired to change the location of the gate 62. Thus, the cam members 74 and 78 can be utilized to classify a multitude of different types of articles and only the location of the cam members will vary when the type and size of the articles to be classified varies. A suitable numerical scale 81 may be provided around the outside of the cam holder 82 to facilitate in locating the cam members therein in a proper spaced apart relationship which is dependent upon the size of the articles to be classified. Preferably each of the cam members 74 and 78 are labeled with the word "up" or "down" which will signify that when the cam follower 84 is engaged therewith the article classifying gate 62 will be located so as to direct the articles in the direction signified by the wording on the cam member. The cams each may be provided with an indexing mark 83 which will enable the cams to be accurately aligned with the numerical scale 81 so as to facilitate set up of the cam members. Thus, when it is desired to set up the apparatus for a run, the operator of the machine will measure the length between the lead edge of the sheet and the trailing edge of each row of articles and then set the cam members at the measurements. For example, if the first article is 10 inches in length the first cam will be set at 10 inches and if the second article is 10 inches in length the second cam will be set at 20 inches on the numerical scale or 10 inches from the first cam. This will enable the articles to be classified as they pass through the apparatus. It should be apparent that this configuration will provide changing the position of the gate 62 when a gap exists between the articles at the position of the gate 62 as the articles flowing along the conveyor 26. Thus, the position of the gate 62 is changed when an article is not flowing therepast. Due to the fact that the cam means has an interrupted configuration, it should be apparent that a plurality of cam members such as the cam members 74 and 78 as illustrated in FIGS. 3 and 4 can easily be arranged to accommodate classification of articles of many different lengths and only the position and the number of cam members need be varied.

Rotation of the cam receiving means 82 effects engagement and disengagement of the cam follower 84 with the cam tracks 75 and 79. It should be apparent that the configuration of the cam tracks are such that the cam follower 84 will be in a position so as to be readily received sequentially in the next cam member as it passes through the interrupted portion of the track. The cam tracks 75 and 79 are provided with flared portions 87 and 85 respectively which enables the cam follower 84 to enter the cam tracks should the cam follower 84 be out of position. It should be evident that the cam tracks only inpart a slight movement to the cam follower 84 as all cams 74 and 78 only have slight height changes therein. Thus, if the cam follower 84 is out of position it will be easily engaged in the next cam track.

When the cam follower 84 is engaged in one of the cam tracks, positive control of the position of the link 72 and the gate 62 is effected by the cam members. However, when the cam follower moves out of one of the cam tracks and is located in the space between the cam members, the cam means is no longer effective to control the position of the gate 62. Therefore, means are provided to maintain the gate 62 in the position to which it has been last moved by one of the cam members when the cam follower moves from that cam member. To this end, a toggle linkage 100 is operatively connected with the bracket 98 to maintain the gate 62 in the position to which it has last been moved by one of the cam members 74 and 78. The toggle linkage 100 includes a shaft 109 which is connected to an arm 102 of the bracket 98 by a yoke 104. The yoke 104 is connected to the arm 102 by a shaft 105 which is rigidly supported by a pin 106 in the arm 102 so that the yoke 104 and shaft 109 may rotate about the shaft 105 relative to the arm 102. The shaft 109 is rotatably supported at its opposite end by a bracket 108. Disposed around the shaft 109 is a spring member 114 which acts between a collar 116 which is located on the shaft 109 and the bracket 108.

The spring 114 loads the toggle linkage 100 and exerts a force on the collar 116 which biases the arm 102 of the bracket 98 about the shaft 64. Since the bracket 98 is affixed to the shaft 64, the spring tends to rotate the shaft 64 and the gate 62 to hold the gate 62 in a selected position.

The toggle linkage 100 is operable to move between the position shown in FIGS. 3 and 4 upon movement of the link 72 by the cam members 74 and 78. When the toggle linkage 100 is in an off-center position as illustrated in FIG. 3 in which the shaft 105 is located to the left of the center line 101 running between the shaft 64 and the bracket 108, the spring 114 will bias the toggle linkage so as to exert a force in a clockwise direction about the longitudinal axis of the shaft 64. When the toggle linkage 100 is in an off-center position as illustrated in FIG. 4 in which the shaft 105 is located to the left of the center line 101 running between the shaft 64 and the bracket 108, the spring 114 will bias the toggle linkage in a counterclockwise direction about the longitudinal axis of the shaft 64. Thus, the direction in which the toggle linkage biases the shaft 64 and the gate 62 will be determined by the position of the toggle linkage.

When the gate 62 is moved in response to one of the cam members 74 engaging with the cam follower 84 the toggle linkage will be in an offset position as illustrated in FIG. 3 and will bias the shaft 64 in a clockwise direction. Thus, when the cam follower 84 moves from the cam track 75 of the cam 74 into one of the interrupted portions of the cam means, the spring 114 will hold the gate member 62 in the position to which it has been moved by the cam 74 and positively control the location of the gate 62. The gate 62 will remain in its first position until one of the cam members 78 engage with the cam follower 84 to rotate the shaft 64 in a counterclockwise direction and move the gate to its second position as illustrated in FIG. 4. Movement of the gate 62 to its second position will cause the toggle linkage 100 to be offset as illustrated in FIG. 4. The toggle linkage will then bias the gate 62 in a counterclockwise direction to thereby hold the gate 62 in its second position when the cam follower 84 moves from the cam track 79 of the cam member 78. The toggle linkage 100 thus maintains the gate 62 in the position to which it has last been moved by one of the cam members when the cam means is in a condition in which it does not control the position of the gate 62.

A pair of stop members 126 and 128 are located adjacent the lower end of the link 72. The stop members 126 and 128 are supported in the blocks 120 and 122, respectively, and are operable to engage with the pin member 124 supported in the lower end of the link member 72 when the gate is located in either its first or second position. When the gate 62 is located in its first position as illustrated in FIG. 3, the stop member 128 engages with the pin 124 to positively fix the position of the gate 62 in its first position and prevent vibration of the link 72. When the gate 62 is located in its second position as illustrated in FIG. 4, the stop member 126 engages with the pin 124 to positively fix the position of the gate 62 in its second position and prevent vibration of the link 72. The stops 126 and 128 are adjustable relative to the blocks 120 and 122 so as to enable the positions of the gate 62 to be positively controlled. When the pin 124 engages with one of the stops, further rotation of the link 72, the bracket 98, the shaft 64 and the gate 62 will be prevented and the gate will be accurately positioned to direct the articles of one class to one of the means for receiving the articles.

It should be apparent that the interrupted configuration of the cam track enables the control means to be easily set to accommodate articles of different lengths. This is a vast improvement over the prior art devices in that if a solid cam track were provided adjustment of the cam track to provide configurations which would accommodate different lengths of articles is difficult and, therefore, different cam tracks must be utilized to classify different articles of different lengths. This would necessitate the operator of the machine to have a large number of costly solid cam tracks at his disposition so as to be able to classify a wide range of articles. In the present invention only a plurality of cam members having configurations such as the cam members 74 and 78 need be provided and the location of the cam members about the cam holder 82 may be varied rather than the configuration of cam members to accommodate different classes of articles. The cam members then cooperate with the toggle linkage to control the position of the gate at all times during the operation of the apparatus.

From the foregoing, it should be apparent that a new and improved article classifying means has been provided to separate the articles of different classes so that the articles of one class flow to one mans for receiving the articles and the articles of another class flow to another means for receiving the articles. The control means is operable to control the position of the articles classifying means so as to effect the flow of the articles to their respective article receiving means. The control means is incapable during at least a portion of the operation of the apparatus to control the position of the article classifying means. Therefore, means have been provided for maintaining the article classifying means in a selected position when the control means is incapable of controlling the position of the article classifying means. It should be apparent that this provides a vast improvement over the prior art article classifying means in that positive control of the article classifying means and the direction of flow of different classes of articles is maintained while providing a versatile mechanism which can accommodate many different types and sizes of articles.

While the present invention has been illustrated showing alternate classification of cartons, obviously, other classifying techniques are also possible. For example, if a carton layout on a sheet has four rows front-to-back, with the first three rows being of like cartons, the gate 62 may divert the first three cartons to one level conveyor 18 or 20, and then be cammed to its other condition to divert the last row to the other conveyor 18 or 20. Numerous other arrangements are also possible because of the type of cam arrangement employed herein.

I claim as my invention:

1. Apparatus for processing a stream of articles made of sheet material, the articles comprising box blanks formed from sheet material with each of the sheets being formed into a plurality of box blanks which lie in a closely spaced relationship in rows which extend transverse to the feed of the sheets through said apparatus, the box blanks in one row being of one type and the box blanks of another row being of another type, said apparatus comprising first and second means for receiving the articles, an article diverting member having a first position in which it directs the flow of the articles of one type to said first means for receiving the articles and a second position in which it directs the flow of the articles of another type to said second means for receiving the articles, third means being effective to move said article diverting member between said first and second positions but ineffective to maintain said article diverting member in a selected one of said positions to which it had been moved by said third means during at least a portion of the operation of said apparatus, and fourth means cooperable with said third means and being ineffective to move said article diverting member but effective to maintain said article diverting member in said selected position during said portion of the operation of said apparatus in which said third means is ineffective to maintain said article diverting member in said selected position.

2. Apparatus for processing a stream of articles as defined in claim 1 wherein said article diverting member comprises a gate which is movable between said first and second positions to thereby provide for the flow of articles to said first and second means for receiving the articles respectively.

3. Apparatus for processing a stream of articles as defined in claim 1 wherein said third means includes a link operatively associated with said article diverting member for moving said article diverting member between said first and second positions, means for effecting movement of said link to thereby move said article diverting member between said first and second positions, said means for effecting movement of said link having a first condition in which the position of said link is positively controlled thereby to effect movement of said article diverting member between said first and second positions and a second condition in which said link is unrestrained thereby.

4. Apparatus for processing a stream of articles as defined in claim 3 wherein said means for maintaining said article diverting member in said selected position comprises a spring loaded toggle linkage which is operable to hold said article diverting member in said selected position when said means for effecting movement of said link is in said second condition in which said link is unrestrained thereby.

5. Apparatus for processing a stream of articles as defined in claim 4 wherein said link includes a cam follower thereon and said means for effecting movement of said link comprises an interrupted cam track which has a cam portion thereon for engaging with said cam follower and effecting movement of said link to thereby move said article diverting member to said selected position and an uninterrupted portion thereon which is incapable of controlling the position of said link.

6. Apparatus for processing a stream of articles as defined in claim 3 wherein said link has a cam follower supported thereon and said means for effecting movement of said link comprises a plurality of spaced apart cam members each of which includes a cam track disposed thereon for engaging with an effecting movement of said link, said cam members being operable to positively control the position of said link and said article diverting member when said cam follower is located in one of said cam tracks and incapable of controlling the position of said link and said cam member when said cam follower is not engaged with one of said cam tracks.

7. Apparatus for processing a stream of articles as defined in claim 6 further including a cam holder for supporting said plurality of cam members and indicia disposed on said cam holder for facilitating the positioning of said cam members in said cam holder.

8. Apparatus for processing a stream of articles made of sheet material, said apparatus comprising first and second means for receiving the articles, an article diverting gate for directing the articles and having a first position which provides for the flow of the articles of one type to the said first means for receiving the articles and a second position which provides for the flow of the articles of another type to said second means for receiving the articles so that all of the articles of the first type flow to said first means for receiving the articles and all of the articles of the second type flow to said second means for receiving the articles, third means for operating said article diverting gate between said first and second positions and comprising a link member operatively associated with said article diverting gate for moving said gate between said first and second positions, a cam follower interconnected with said link member, a plurality of cam members for moving said cam follower and said link member to thereby move said article diverting gate to a selected one of said first and second positions, said cam members being engageable with said cam follower during a portion of the operation of said apparatus to thereby control the position of said article diverting gate when one of said cam members is engaged with said cam follower, and being disengaged with said cam members during at least a portion of the operation of said apparatus so as to be ineffective to maintain said article diverting gate in a selected one of said positions, and fourth means ineffective to move but effective to maintain said article diverting gate in said selected position during said portion of the operation of said apparatus in which said cam members are disengaged with said cam follower and are ineffective to maintain said article diverting gate in said selected position.

9. Apparatus for processing a stream of articles as defined in claim 8 wherein said means for maintaining said article diverting gate in said selected position during said portion of the operation of said apparatus in which said cam members are ineffective to maintain said article diverting gate in said selected position comprises a spring loaded toggle linkage which biases said article diverting gate to said position to which it has last been moved by one of said cam members.

10. Apparatus for processing a stream of articles as defined in claim 9 further including a cam holder which is rotatable in a timed relationship with the speed at which the articles flow through said apparatus, said plurality of cam members being supported in a spaced apart relationship by said cam holder and rotatable therewith so that said cam members sequentially engage with said cam follower to effect movement of said article diverting gate between said first and second positions so that said gate moves between said first and second positions in a timed relationship with the speed of the articles flowing through said apparatus, said plurality of cam members being movable relative to each other within said cam holder so that movement of said article diverting gate between said first and second positions may be varied to thereby enable said apparatus to accommodate and divert various sizes of articles.

References Cited

UNITED STATES PATENTS

| | | | |
|---|---|---|---|
| 2,427,223 | 9/1947 | Moore | 271—64 X |
| 2,917,168 | 12/1959 | Faeber | 271—64 X |
| 3,206,191 | 9/1965 | Hantscho | 271—64 X |

JOSEPH WEGBREIT, Primary Examiner